(12) United States Patent
Frasson et al.

(10) Patent No.: US 8,197,736 B2
(45) Date of Patent: Jun. 12, 2012

(54) METHOD FOR PROVIDING A FOOTWEAR ANTISLIP TREAD

(75) Inventors: Gianni Frasson, San Martino di Lupari (IT); Gilberto Frasson, San Martino di Lupari (IT)

(73) Assignee: Frasson S.R.L., Loria, Frazione Ramon (IT)

( * ) Notice: Subject to any disclaimer, the term of this patent is extended or adjusted under 35 U.S.C. 154(b) by 1129 days.

(21) Appl. No.: 12/073,727

(22) Filed: Mar. 10, 2008

(65) Prior Publication Data

US 2008/0229625 A1    Sep. 25, 2008

(30) Foreign Application Priority Data

Mar. 23, 2007 (IT) .............................. PD2007A0107

(51) Int. Cl.
*B29C 45/14* (2006.01)

(52) U.S. Cl. ........ 264/254; 264/244; 264/255; 264/257; 264/275

(58) Field of Classification Search .................. None
See application file for complete search history.

(56) References Cited

U.S. PATENT DOCUMENTS

| 1,457,826 | A | | 6/1923 | Egerton | |
|---|---|---|---|---|---|
| 2,557,946 | A | * | 6/1951 | Crooker | 36/32 R |
| 5,833,898 | A | * | 11/1998 | Dutt | 264/102 |
| 5,955,017 | A | * | 9/1999 | Foffano et al. | 264/161 |
| 5,987,782 | A | * | 11/1999 | Bramani | 36/107 |
| 6,255,235 | B1 | * | 7/2001 | Hiraoka et al. | 442/101 |
| 6,430,844 | B1 | * | 8/2002 | Otis | 36/59 R |
| 6,782,642 | B2 | * | 8/2004 | Knoche et al. | 36/129 |
| 7,081,221 | B2 | * | 7/2006 | Paratore et al. | 264/161 |
| 7,313,876 | B2 | * | 1/2008 | Morgan et al. | 36/59 R |
| 7,322,131 | B2 | * | 1/2008 | Yamashita et al. | 36/59 R |
| 7,788,827 | B2 | * | 9/2010 | Fogg et al. | 36/59 C |
| 8,029,715 | B2 | * | 10/2011 | Fogg et al. | 264/273 |
| 2003/0121179 | A1 | * | 7/2003 | Chen | 36/30 R |
| 2003/0227105 | A1 | * | 12/2003 | Paratore et al. | 264/161 |

FOREIGN PATENT DOCUMENTS

| EP | 1 177 884 A | 2/2002 |
|---|---|---|
| GB | 2 392 369 A | 3/2004 |

* cited by examiner

*Primary Examiner* — Edmund H. Lee
(74) *Attorney, Agent, or Firm* — Modiano & Partners; Albert Josif; Daniel O'Byrne

(57) ABSTRACT

A method for providing an antislip tread and an antislip tread provided with the method. The tread has a plurality of antislip inserts made of fabric or nonwoven fabric which emerge from the surfaces intended for contact with the ground. The inserts made of fabric or nonwoven fabric may also form a substantially continuous surface with the surface made of rubber or plastic material.

14 Claims, 4 Drawing Sheets

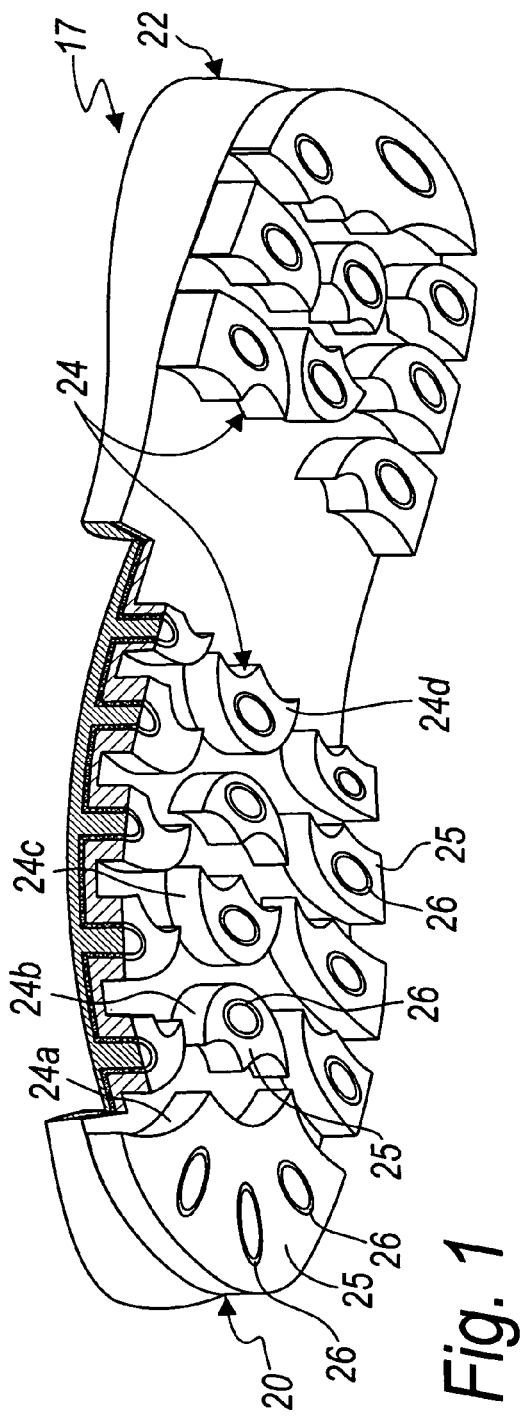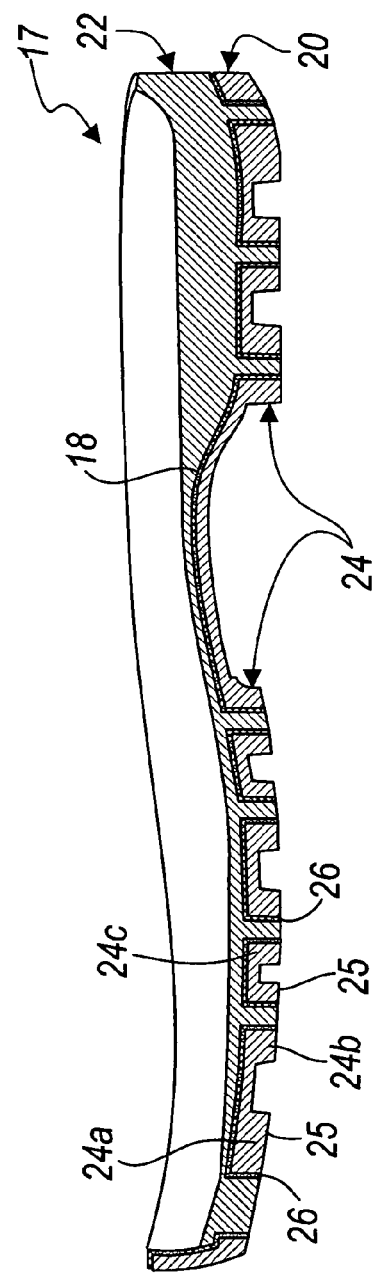
Fig. 1
Fig. 2

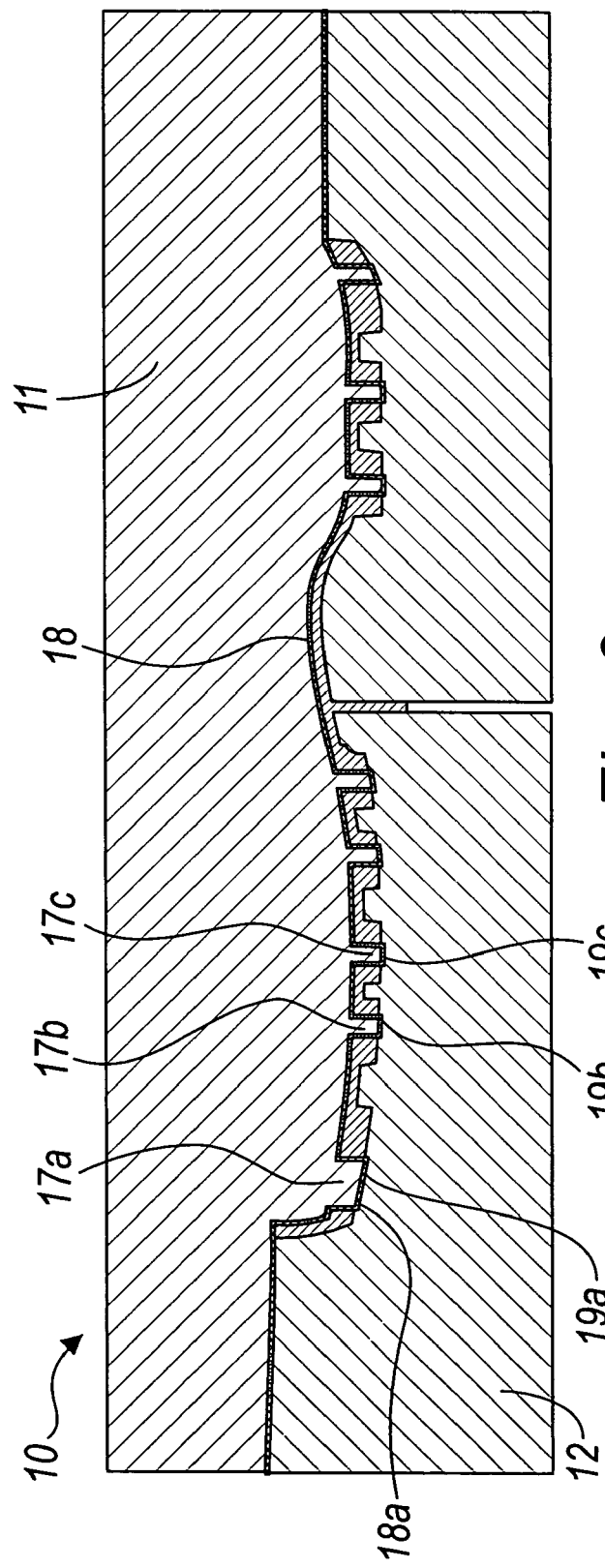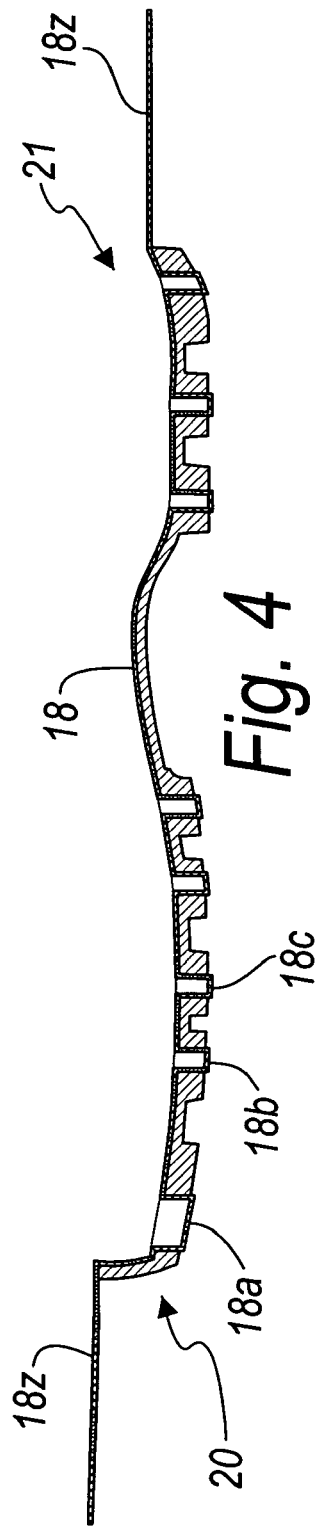

METHOD FOR PROVIDING A FOOTWEAR ANTISLIP TREAD

The present invention relates to an antislip tread for footwear.

The present invention also relates to a method for providing said antislip tread.

BACKGROUND OF THE INVENTION

As is known, there are many situations in which it is necessary to walk, run or work on ground made slippery by rain, mud, snow and ice, or to pass such ground to dry ground covered with tarmac and hard and then back onto very slippery ground.

These ground conditions can affect the feet of an athlete, of a mountain climber, of an excursionist or of any person who works in these conditions every day.

Various types of shoe are currently known which are provided with soles with antislip tread for trekking, walking and safety.

It is also known that there are soles which constitute the tread directly, but there are also soles which, being made of materials which are not resistant to abrasion, have a tread which is applied to the lower part and is made of a different material which is more resistant to wear and to the stresses imparted by the forces involved during running or walking.

While antislip safety shoes are generally mostly provided simply with a sole with a tread which is grooved in a particular manner, trekking boots are also preset for fixing crampons to the sole.

Ordinary boots and rock-climbing boots are also known which are provided with crampons which can be extracted from the sole and retracted into it depending on whether one has to walk on ice or on a non-icy surface.

Said extractable crampons affect one or two limited regions of the sole and thus ensure grip only when at least one of said two regions, generally the toe and the heel, are pressed on the ground; further, in order to extract and retract the crampons it is necessary to act manually on the appropriately provided mechanism with which the sole is provided, interrupting the walk and crouching to manipulate the shoes on one's feet.

Further, the wearer of such shoes with soles provided with extractable crampons must realize in time that he/she is about to walk on icy ground and must act promptly to extract the crampons, otherwise the risks of falling are the same as with a pair of normal shoes.

Grip studs are also known which can be applied to any tread made of rubber or plastic material of any type of shoe; said studs can be removed easily from the anchoring seats, which are provided by screwing them into the tread, and subsequently reinstalled.

Although this series of studs ensures excellent grip on ice and rock, it requires considerable time for fitting and removal, and therefore the shoe prepared to deal with icy or generally slippery ground is very awkward to use on normal ground.

Further, screwing said very hard studs into the tread causes, if the tightening force is excessive, the tearing and cutting of the sole on the part of the threaded part of the stud, so that the stud is poorly positioned and does not work correctly but indeed flexes and tends to escape from the seat that has just been formed by the thread in the tread.

In a manner similar to what has been described for the soles of shoes, the treads of tires, even though they are grooved and temperature-adjusted, are well-suited for dealing with icy ground only with chains or studs.

Studded wheels are very awkward, since they have to be fitted as a replacement of ordinary wheels with a normal tread which is simply grooved, while snow chains are notoriously very awkward to fit, in addition to the fact that not all cars with high cylinder capacity can be fitted with such snow chains due to the proximity of the wheel to the wheelhouse that protects it.

Snow socks made of antislip fabric in which the wheel is wrapped are currently known as a replacement of snow chains.

Although these socks are easier to fit than chains and equally effective in terms of grip on ice, they too require a fitting operation and a removal operation in addition to occupying a certain volume in the trunk, like chains.

SUMMARY OF THE INVENTION

The aim of the present invention is to provide an antislip tread which is capable of obviating the drawbacks of known types of tread.

Within this aim, an object of the present invention is to provide an antislip tread which is capable of performing fully its function without having to be fitted with studs, crampons or any other auxiliary antislip device.

Another object of the present invention is to provide an antislip tread which can be incorporated easily in known types of product, such as soles of shoes or boots, tires, tracks and the like.

Within this aim, another object of the present invention is to provide a method for providing an antislip tread for producing soles for shoes, tires, tracks and the like, provided with a tread which solves the drawbacks of known types of tread and corresponding antislip devices.

Another object of the present invention is to provide an antislip tread with which it is possible to provide soles for shoes and boots of any type and shape, from a normal city shoe to a technical trekking boot and sports shoe in general, to a safety shoe.

Another object of the present invention is to provide a sole with antislip tread for soles which has technical and comfort-related properties which are not inferior to those of known types of shoe sole.

Another object of the present invention is to provide an antislip tread and a method for manufacturing it which can be obtained with known systems and technologies.

This aim and these and other objects, which will become better apparent hereinafter, are achieved by an antislip tread, characterized in that it has, on the surfaces designed for contact with the ground, a plurality of antislip inserts made of fabric or nonwoven fabric.

Advantageously, such an antislip tread is also characterized in that said inserts of fabric or nonwoven fabric emerge from said ground contact surfaces or form with them a substantially continuous surface.

A method for providing an antislip tread according to the invention consists in:

inserting within a first mold, provided internally with a series of pins which protrude from a first mold part so as to pass through the impression formed within the mold to shape holes in the tread, an element made of fabric or nonwoven fabric which is spread so as to affect the entire impression, or a plurality of elements made of fabric or nonwoven fabric, located at said pins, so that when the first mold is closed said single element or said localized elements made of fabric or nonwoven fabric surround at least the free end of said pins, introducing in the first mold rubber or another equivalent plastic material, so that it is interposed between the second mold part and the single element or the localized elements made of fabric or nonwoven fabric, vulcanizing the injected rubber, so that a first lower layer of the tread is formed with the single element or the localized elements embedded therein and pressed against the pins, closing the first intermediate component, obtained in the first mold, inside a second mold for overmolding a second layer made of plastic material or rubber for filling the holes generated by said pins and for locking said single element or said localized elements made of fabric or nonwoven fabric between said two first and second layers, extracting the second intermediate component from the second mold and finishing it.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 1 is a perspective view of a tread according to the invention, provided with a method according to the invention;

FIG. 2 is a sectional side view of the sole of FIG. 1;

FIG. 3 is a schematic side view of a first mold for a first step of the method according to the invention;

FIG. 4 is a sectional side view of a first intermediate component provided in said first step of the method according to the invention;

DESCRIPTION OF THE PREFERRED EMBODIMENTS

Figure 5:
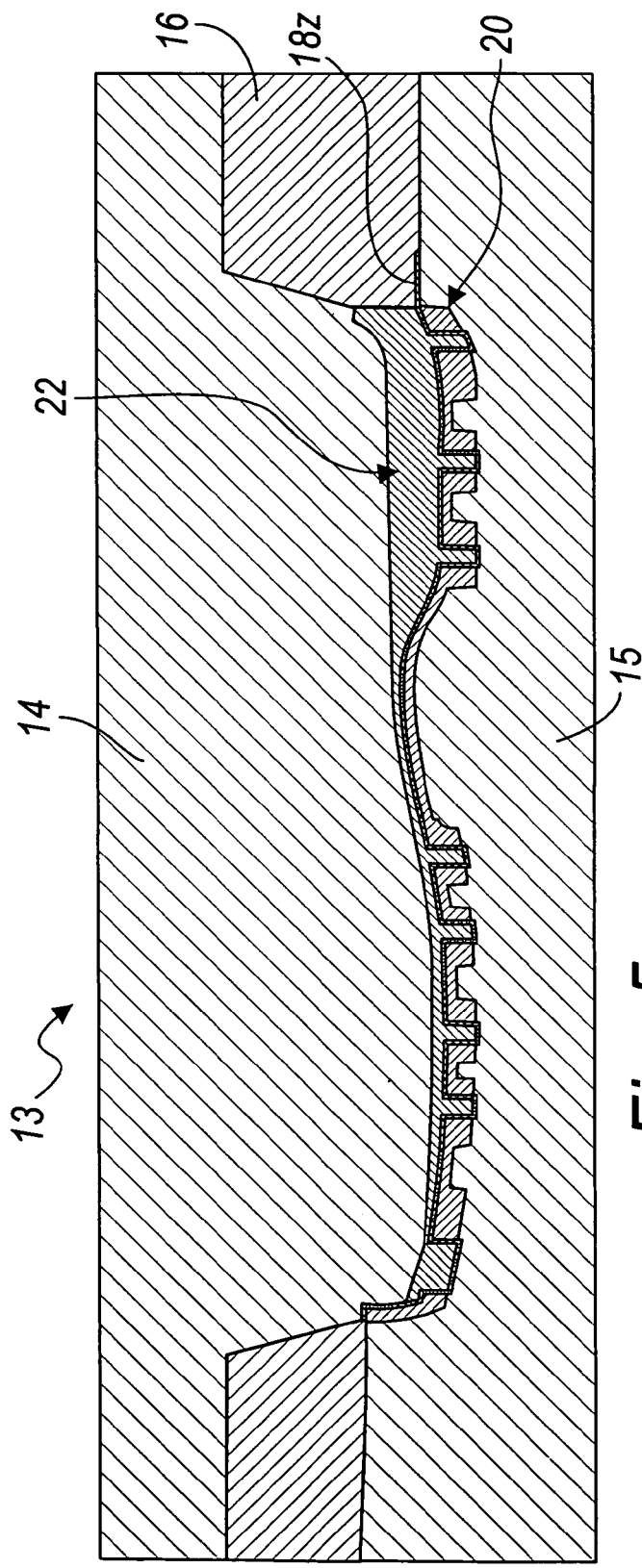
FIG. 5 is a schematic sectional side view of a second mold for providing a second step of the method according to the invention.

With reference to the figures, a tread according to the invention is exemplified in FIGS. 1 and 2 as part of a sole 17 and is formed thereat by raised parts 24a, 24b, 24c, 24d and the like, i.e., the grooved portions, which protrude downward from the sole 17.

An antislip tread 24 has, on surfaces 25 intended for contact with the ground, a plurality of antislip inserts 26 made of fabric or nonwoven fabric.

The inserts 26 made of fabric or nonwoven fabric emerge from the ground contact surfaces 25 or form with them a substantially continuous surface, depending on the finish applied to the tread 24, described in greater detail hereafter.

The method for providing such an antislip tread according to the invention uses a first mold 10, shown schematically in cross-section in FIG. 3, which is constituted by a first mold part 11 and by a second associated mold part 12, and a second mold 13, shown schematically in cross-section in FIG. 5, which in turn is composed of a third mold part 14 and a fourth mold part 15, with an annular spacer 16 interposed so as to surround the impression formed by the two mated mold parts.

The first mold 10 is provided with pins 17a, 17b, 17c et cetera, which protrude from a first mold part 11 so as to pass through the impression formed inside the mold 10, said pins determining the shape of holes on the tread.

The first mold 10 and the second mold 13 allow to provide for example a sole 17 with an antislip tread 24 according to the invention, which also is a subject of the invention and is described in greater detail hereinafter, and is clearly visible in FIGS. 1 and 2.

The method according to the invention described here by way of non-limiting example of the invention is intended to provide a sole 17, but it is understood that it can be used in general to provide any other product which comprises a tread.

The method according to the invention comprises the following steps.

A first step provides for the insertion, within the first mold 10, of an element 18 made of fabric or nonwoven fabric, which is spread so as to affect the entire impression; when the first mold 10 closes, the element 18 is pressed between the pins 17a, 17b et cetera of the first mold part 11 and corresponding facing recesses 19a, 19b et cetera provided on the second mold part 12.

The recesses 19a and 19b are contoured so as to accommodate the parts 18a, 18b, 18c et cetera of the element 18 which are arranged so as to surround the end of the pins 17a et cetera.

In the second step of the method according to the invention, rubber or other equivalent plastic material is introduced in the first mold 10, so that such material is interposed between the second mold part 12 and the element 18 made of fabric or nonwoven fabric, as can be seen in FIG. 3.

The rubber can be introduced in the first mold 10 by injection or, as an alternative, by depositing a block for compression molding, or by casting.

The third step is a step for vulcanization of the injected rubber, so that a first lower tread layer 20 forms which has the element 18 made of fabric or NWF (non-woven fabric) embedded therein and pressed against the pins 17a, 17b et cetera.

The first layer 20 with the element 18 made of fabric forms a first intermediate component 21.

In a fourth step of the method, the first intermediate component 21 obtained in the first mold 10 is closed inside the second mold 13 for the overmolding of a second layer 22 of plastic material or rubber, in order to fill the holes generated by the pins 17a, 17b et cetera and to lock the element 18 made of fabric or NWF between the first layer 20 and the second layer 22.

In this case also, such overmolding can be performed by injection or, as an alternative, by deposition of a block for compression molding, or by casting.

The material that can be used in this fourth step can be selectively rubber or a plastic material; said plastic materials are preferably synthetic rubbers, thermoplastic materials or polyurethane materials.

A particularity of the fourth step is that the perimetric flap 18z of the fabric element 18 is pinched between the fourth mold part 15 and the overlying annular element 16, which in turn is pressed by the third mold part 14; the flap 18z provides a seal and makes the chamber formed between the third mold part 14 and the fabric element 18 advantageously hermetic, said chamber being subjected to intense pressures if a highly expanding plastic material is injected into it.

Figure 6:
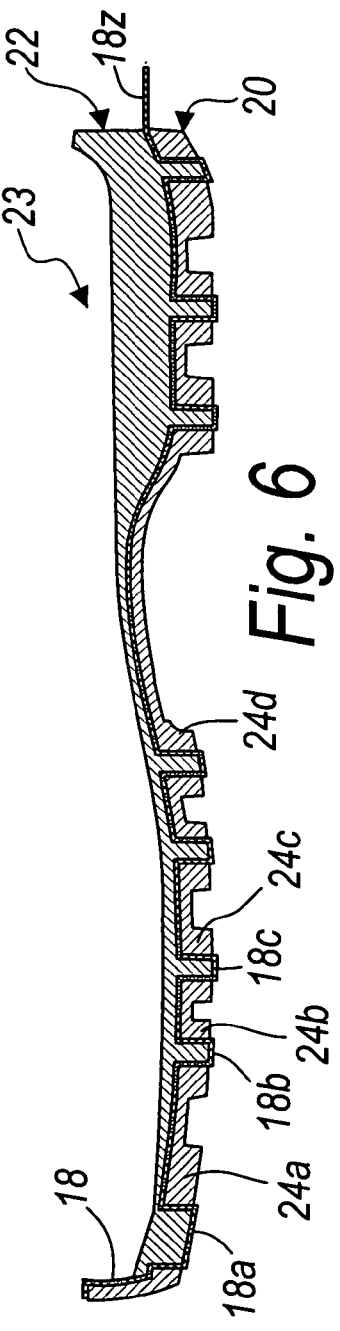
FIG. 6 is a sectional side view of a second intermediate component provided in said second step of the method according to the invention.

A second intermediate component, shown in FIG. 6 and designated by the reference numeral 23, is obtained from said fourth step.

In a fifth step of the method, the second intermediate component 23 is extracted from the second mold 13 and is finished.

Said finishing comprises a first operation for removing the perimetric flap 18z of fabric.

Finishing can also comprise an operation for removing material from the surfaces 25 intended for contact with the ground of the raised parts 24a, 24b et cetera which form the tread 24, or the removal of the portions 18a, 18b, 18c of the element 18 which surround in a lower region the ends of the pins 17a, 17b, 17c and the like, so that the inserts 26 made of fabric or nonwoven fabric face the ground contact surfaces 25, forming therewith a substantially continuous surface.

The portions 18a et cetera that surround the ends of the pins can be removed also only partially, so that a flap of the inserts 26 emerges from the ground contact surfaces 25.

Figure 7:
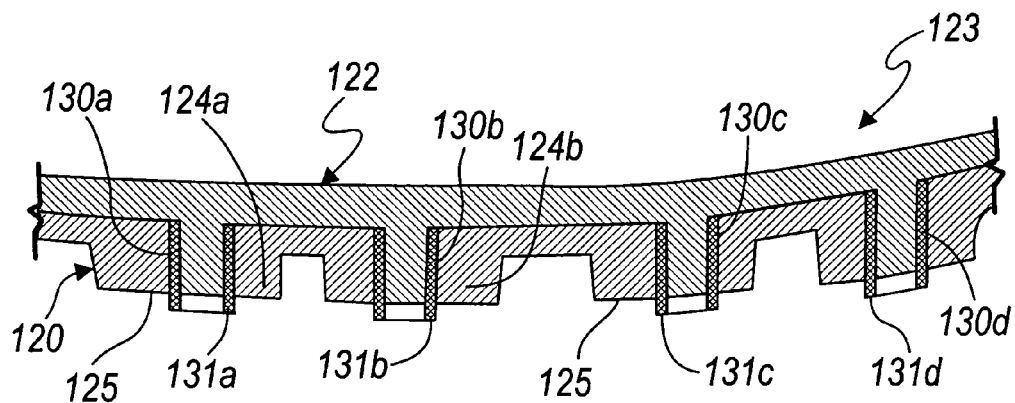
FIG. 7 is a schematic view of a variation of the method according to the invention.
Figure 8:
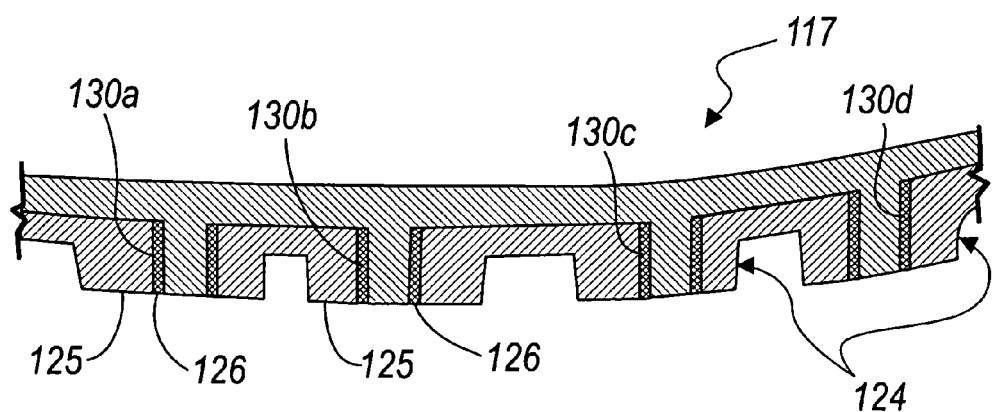
FIG. 8 is a sectional view of a portion of a tread provided with said variation of the method according to the invention.

A constructive variation of the method according to the invention is shown schematically in FIGS. 7 and 8.

In said constructive variation, the first step provides for the insertion, within the first mold with pins as described above, not of a single element 18 made of fabric or nonwoven fabric spread so as to affect the entire impression, but a plurality of elements 130a, 130b et cetera, also made of fabric or NWF, which are localized at the individual pins, so that when the first mold is closed they surround at least the free end of said pins.

The localized fabric elements 130a et cetera are each provided by a tube made of fabric or NWF, which is fitted over a corresponding pin of the first mold part.

FIG. 7 illustrates a portion of the second intermediate component 123 for providing a sole 117; in FIG. 7, it can be seen that the localized elements 130a et cetera surround the holes formed by the pins and filled by the rubber or plastic material that forms the second layer 122, and that the same elements 130a et cetera are surrounded externally by the first layer 120, except for the lower end, respectively 131a, 131b et cetera, which protrudes with respect to the lower surface 125 of the raised parts of the first layer 120.

During the first step of the method, the lower ends 131a et cetera of the localized elements 130a et cetera are arranged in the recesses 19a et cetera of the second mold part 12 in order to provide the inserts 126.

As in the first variation of the method, in this second variation also the final step provides for final finishing, with optional removal of material from the surfaces 125 intended for contact with the ground of the raised parts 124a, 124b and the like of the tread 124, so that the inserts 126 form a continuous surface with the surfaces 125 made of rubber or plastic material.

In this manner, similarly to what is achieved with the first variation of the method, the areas 126 form a substantially continuous surface together with the surface 125 made of rubber or plastic material.

As an alternative, the ends 131a et cetera of the localized elements 130a et cetera might not be removed or might be removed only partly, so as to emerge from the contact surfaces 125.

Accordingly, with a method according to the invention as described above, one obtains, also as a part of the present invention, an antislip sole 17 and 117 provided with a tread 24 and 124 according to the invention.

The tread 24 and 124, which can be identified with the raised parts 24a, 24b and the like and 124a, 124b and the like of the sole 17 and 117, is characterized in that on the surfaces 25 and 125 of the tread 24 and 124 intended for contact with the ground there are a plurality of antislip inserts 26 and 126 made of fabric or nonwoven fabric.

The fabric which can be used, as well as the NWF, can be of any type according to the requirements and needs of the manufacturer of the shoe or of the user.

A shoe or boot provided with a sole 17 or 117 according to the invention with an antislip tread 24 and 124 with antislip inserts 26 and 126 made of fabric or NWF is advantageously ready for use on any slippery ground, since it ensures grip on the ground even on ice or on oily or slippery surfaces without the need to apply crampons or studs thereto.

Further, the present invention provides a sole 17 and 117 with an antislip tread with which it is possible to provide shoes and boots of any type and shape, from an ordinary city shoe to a technical trekking boot and sports shoe in general to a safety shoe.

Moreover, the method according to the invention allows to provide an antislip tread which allows to manufacture soles with technical and comfort-related properties which are not inferior to those of the soles of known types of shoe, by way of the overmolding of the second layer 22 and 122, which can be made of the material most suitable to provide a certain level of comfort for the user, on a first layer 20 and 120, which can be made of a different material with respect to the second layer, and suitable technical characteristics depending on the destination of the shoe for which the sole is manufactured.

Moreover, the present invention provides an antislip tread, a method for providing an antislip tread, and a sole provided with said antislip tread, which can be provided by means of known systems and technologies.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of art.

The disclosures in Italian Patent Application No. PD2007A000107 from which this application claims priority are incorporated herein by reference.

What is claimed is:

1. A method for providing a footwear antislip tread, comprising:

providing a first mold which comprises a first mold part and a second mold part, and wherein said first mold part is provided internally with a series of pins, inserting within said first mold part a single element made of fabric or nonwoven fabric which is spread so as to extend over an entire impression, or a plurality of localized elements made of fabric or nonwoven fabric, which are located at said pins, closing together said first mold part and said second mold part so that the first mold is closed and said single element or said localized elements made of fabric or nonwoven fabric surround at least a free end of said pins which pass through an impression formed within the closed first mold for shaping holes in the tread, introducing in the closed first mold a moldable material selectable among rubber and plastic materials, so that the moldable material is interposed between said second mold part and the single element, or the localized elements made of fabric or nonwoven fabric, vulcanizing the moldable material introduced in the closed first mold, so that a first lower layer of the tread is formed which embeds, and presses against the pins, the single element or the localized elements so as to form a first intermediate component, providing a second mold which comprises a third mold part and a fourth mold part, closing the first intermediate component inside said second mold by closing together said third and fourth mold parts, overmolding in the closed second mold a second layer, made of plastic or rubber material, in order to fill holes generated by said pins and to lock said single element or said localized elements made of fabric or nonwoven fabric between said two first and second layers, and forming a second intermediate component; and extracting the second intermediate component from the second mold and performing a finishing operation thereon.

2. The method of claim 1, wherein said finishing operation consists in removing at least part of portions of the single element, or of the localized elements which emerge from the ground contact surfaces of the tread.

3. The method of claim 1, wherein said finishing operation consists in removing material from the ground contact surfaces of the tread, so that the inserts made of fabric or nonwoven fabric form with said surfaces a substantially continuous surface.

4. The method of claim 1, wherein said single element, when the first mold closes, is pressed between the pins of the first mold part, and corresponding facing recesses provided on the second mold part, whereby to form the inserts, said formed inserts facing, or emerging from, said ground contact surfaces of the tread.

5. The method of claim 4, wherein said recesses are contoured so as to accommodate portions of the single element or of the localized elements which are arranged so as to surround the free end of said pins.

6. The method of claim 1, wherein the introduction of the rubber or plastic material in the first mold is made by an operation selected among injection, deposition of a block of material for compression molding, and casting.

7. The method of claim 1, wherein the overmolding that is performed in the second mold is made by an operation selected among injection, deposition of a block of material for compression molding, and casting.

8. The method of claim 7, wherein material that is usable for the overmolding in the closed second mold is selectable among rubber and a plastic material, said plastic material being selectable among synthetic rubber, thermoplastic materials and polyurethane materials.

9. The method of claim 5, wherein during said step for the closure of the first intermediate component in the second mold for the overmolding of the second layer, a perimetric flap of the fabric element is pinched between a fourth mold part and an overlying annular element of the second mold, which in turn is pressed by a third mold part, said flap providing a seal so as to make a chamber formed between the third mold part and said fabric element hermetic.

10. The method of claim 9, wherein the finishing operation comprises removal of said perimetric flap of the element made of fabric or nonwoven fabric and of the portions that surround in a lower region the free ends of the pins.

11. The method of claim 1, further comprising an insertion, within the first mold, of a plurality of said localized elements made of fabric or nonwoven fabric, which are arranged so as to be localized at individual ones of said pins, so that when the first mold is closed the localized elements surround at least said free end of said pins.

12. The method of claim 11, wherein said localized elements are each formed by a tube made of fabric or nonwoven fabric fitted over a corresponding pin of the first mold part.

13. The method of claim 1, wherein fabric, and nonwoven fabric, are used to provide said single element or said localized elements that is of any structure and material selected depending on requirements and needs.

14. The method of claim 1, comprising further forming a product or portion of product which comprises a tread with ground contact surfaces provided with a plurality of antislip areas made of fabric or nonwoven fabric.

* * * * *